United States Patent [19]
Durney

[11] Patent Number: 5,649,796
[45] Date of Patent: Jul. 22, 1997

[54] CARBIDE SPADE-TYPE DRILL BIT

[75] Inventor: Max W. Durney, Penngrove, Calif.

[73] Assignee: Castle Tool Machinery, Incorporated, Petaluma, Calif.

[21] Appl. No.: 446,893

[22] Filed: May 17, 1995

[51] Int. Cl.$^6$ .................................................. B23B 51/00
[52] U.S. Cl. ......................... 408/211; 408/144; 408/212; 408/227
[58] Field of Search .................. 408/211–213, 144, 408/223–225, 227, 228

[56] References Cited

U.S. PATENT DOCUMENTS

| | | | |
|---|---|---|---|
| 679,406 | 7/1901 | Watson | 408/223 |
| 2,575,332 | 11/1951 | Cummins | 408/144 |
| 2,600,286 | 6/1952 | Weiland | 408/211 |
| 3,920,350 | 11/1975 | Southall | 408/225 |
| 4,330,229 | 5/1982 | Croydon | 408/230 |
| 4,480,952 | 11/1984 | Jeremias | 408/224 |
| 4,529,341 | 7/1985 | Greene | 408/212 |
| 4,595,322 | 6/1986 | Clement | 408/230 |
| 4,950,111 | 8/1990 | Thomas | 408/212 |
| 5,061,127 | 10/1991 | Thomas | 408/212 |
| 5,221,166 | 6/1993 | Bothum | 408/212 |
| 5,291,806 | 3/1994 | Bothum | 76/112 |

*Primary Examiner*—Steven C. Bishop
*Attorney, Agent, or Firm*—Flehr Hohbach Test Albritton & Herbert LLP

[57] ABSTRACT

A spade drill bit device including an elongated shaft formed for rotation about a longitudinal axis thereof, and a flattened blade portion at one end of said shaft. The blade portion has generally planar and parallel opposing faces, and defines opposing side edges, and an end cutting edge therebetween. The cutting edge includes a pair of opposing side spurs each having spur tip portions positioned at the lateral extremities of the cutting edge and terminates at the corresponding side edge. A cutting edge triangular-shaped center tip is included axially aligned with the longitudinal axis, and having a distal end extending beyond the side spurs. The center tip is defined by downward edge portions extending away from the distal end. The cutting edge further includes respective converging edge portions extending between and connecting each side spur to the center tip. Each converging edge portion intersects a respective downward edge portion at a corresponding curved nadir portion positioned closer to the center tip than the respective spur portion.

20 Claims, 2 Drawing Sheets

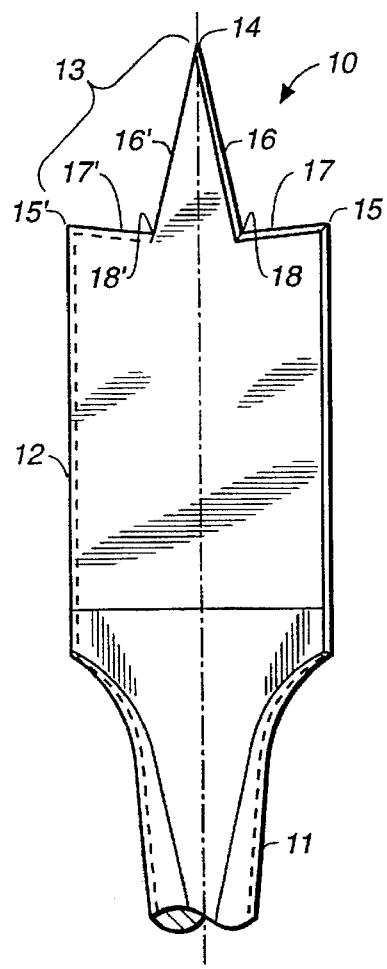
FIG._1
(PRIOR ART)
FIG._2
(PRIOR ART)
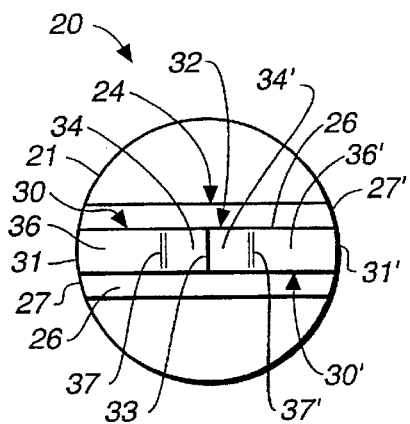
FIG._6
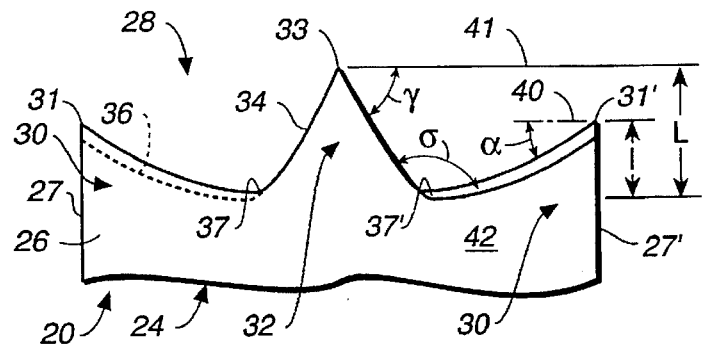
FIG._7

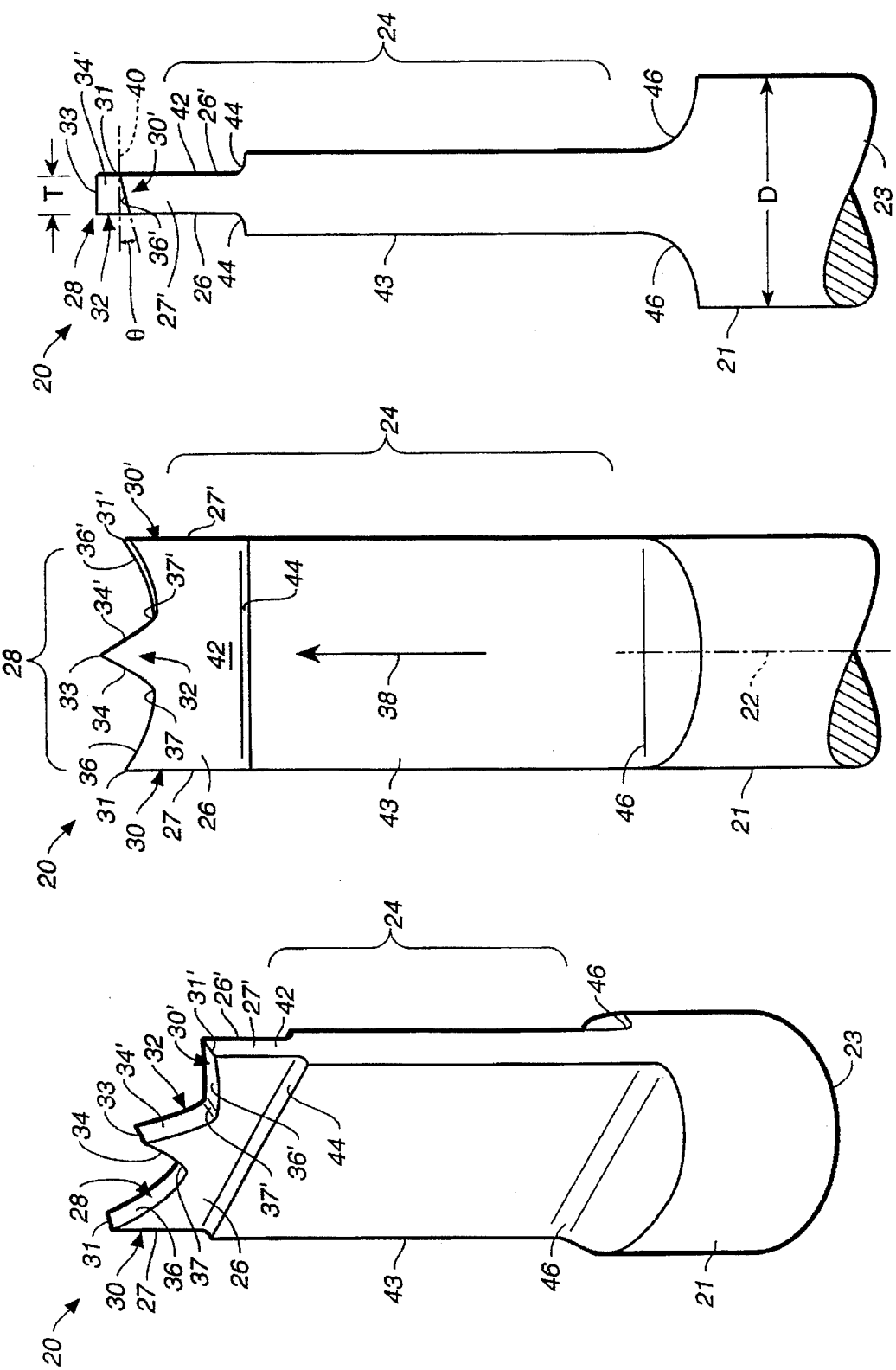

CARBIDE SPADE-TYPE DRILL BIT

TECHNICAL FIELD

The present invention relates, generally, to drill bits and, more particularly, relates to spade-type drill bits for resin impregnated particle board and plywood, and high-pressure plastic materials.

BACKGROUND ART

Spur tipped spade-type drill bits are commonly employed for drilling relatively large holes in wood and other similarly cutting resistant materials. These rather low cost alternatives to more costly, but more precise, conventional auger drill bits are easier to manufacture and are to some extent disposable. Hence, although relatively imprecise, spade drill bits are desirable in many situations.

FIG. 1 illustrates a typical steel spade bit 10 which includes an elongated shank or shaft 11 with one end formed for removable receipt in a drill assembly (not shown) during operational use. The opposite end includes a plate-like spade bit portion 12 forming a cutting edge 13 at the distal end thereof. The cutting edge 13 of more recent spade-bit designs include a centering tip 14 as well as a pair of spur tips 15, 15' on opposite sides of the centering tip. Typically, the downward angled edges 16, 16', forming centering tip 14, and the spur tip edges 17, 17', forming a portion of spur tips 15, 15', intersect one another at respective corner portions 18, 18' between centering tip 14 and the corresponding spur tip 15, 15'. During operation, the centering tip centers the drill bit during rotational cutting. Subsequently, the spaced-apart spur tips engage the material to be cut to define the perimeter of the bore before the portions between the center tip and the spur tip are excavated. Typical of these patented spur tipped spade-type drill bits may be found in U.S. Pat. Nos. 5,221,116; 5,061,127; 4,950,111; and 4,595,322.

While these spade-type drill bits adequately bore holes in woods and other relatively soft materials, problems occur when these relatively low operating speed bits are employed to cut harder and more abrasive materials which include particle board, MDF, and plywoods, and these same materials faced with plastic laminates such as urea resin or melamine resin based particle boards and plywoods. The increased abrasiveness of these materials to be cut, in combination with the low operating speed, causes these materials to easily dull the drill cutting edges of the bit.

Further, the discrete corner portions 18, 18' below spur tips 15, 15' and centering tip 14 cause significant problems during the drilling operation. As the chips are cut or sheared from a block of material, the cut chips compete for space in these corners where they become wedged therein. Hence, greater drilling pressures and forces in the axial direction are required to compensate for this space competition.

Moreover, the formation of the corner portions themselves increase the overall length or path of each combined edges (i.e., downward edge 16, 16' and spur tip edge 17, 17', respectively). This substantially increases the operating friction, thus generating heat, and reduces the cutting capability of the blade. Accordingly, to cut the above-mentioned more abrasive materials, this combination also necessitates a substantial increase in the operating pressures and forces in the axial direction, as well as larger power and torque requirements of the drilling assembly.

To drill hard composites or more abrasive materials such as urea resin or melamine resin based particle boards and plywoods, solid carbide or carbide tipped brad-point drills (FIG. 2) are often employed. These fluted drill bits satisfactorily bore holes in these materials but require higher operating speeds of the drill, are more costly, and are difficult to resharpen.

DISCLOSURE OF INVENTION

Accordingly, it is an object of the present invention to provide a spur tipped spade-type drill bit capable of effectively boring holes in particle board, MDF, and plywoods, and these same materials faced with plastic laminates such as urea resin or melamine resin based particle boards and plywoods.

Another object of the present invention is to provide a carbide spade-type drill bit which cuts precision bores in resin based particle boards and plywoods, and high-pressure plastics.

Yet another object of the present invention is to provide a carbide spade-type drill bit which decreases the competition for space for the cut chips between a center tip and the spur tips of the drill bit.

Still another object of the present invention is to provide a spade-type drill bit which requires substantially less power and drilling forces for drill holes during the drilling operation.

Another object of the present invention is to effectively minimize the cutting length of the edges between the spur tip and the center tip.

It is a further object of the present invention to provide a carbide spade-type drill bit which is durable, low cost, compact, easy to maintain, and is easy to use by unskilled personnel.

In accordance with the foregoing objects, the present invention provides a spade drill bit device including an elongated shaft formed for rotation about a longitudinal axis thereof, and a flattened blade portion at one end of the shaft. The blade portion has generally planar and parallel opposing faces, and defines opposing side edges, and an end cutting edge therebetween. The cutting edge includes a pair of opposing side spurs each having spur tip portions positioned at the lateral extremities of the cutting edge and terminates at the corresponding side edge. A triangular-shaped center tip portion of the cutting edge is provided axially aligned with the longitudinal axis, and which includes a distal end extending beyond the side spurs. The center tip is defined by downward edge portions extending away from the distal end. The cutting edge further includes respective converging edge portions extending between and connecting each side spur to the center tip. Each converging edge portion intersects a respective downward edge portion at a corresponding curved nadir portion positioned closer to the center tip than the respective spur portion.

The spade-type drill bit is preferably made of carbide, wherein the thickness of the blade portion between the opposing faces is predetermined such that the ratio of the diameter of the shaft to the predetermined thickness is between about 5.25:1 to about 6.25:1.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIG. 1 is a fragmentary, front elevation view of a prior art spade-type drill device.

FIG. 2 is a front elevation view of a prior art brad-point fluted drill device.

FIG. 3 is a top perspective view of a carbide spade-type drill bit device constructed in accordance with the present invention.

FIG. 4 is a fragmentary front elevation view of the drill bit device of FIG. 3.

FIG. 5 is a fragmentary side elevation view of the drill bit device of FIG. 3.

FIG. 6 is a top plan view of the drill bit device of FIG. 3.

FIG. 7 is a fragmentary, enlarged, front elevation view of the cutting edge tip portion of the drill bit device of FIG. 4.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 3 and 4, where a spur tipped spade-type drill bit device, generally designated 20, is illustrated for description in detail. Drill bit 20 includes an elongated shaft or shank 21 formed for rotation about a longitudinal axis 22 thereof. One end 23 of shaft 21 is dimensioned for removable mounting to a drill assembly (not shown), while an opposite end thereof provides a flattened blade or spade portion 24 formed for cutting materials. Briefly, end 23 is cooperatively grasped by the chuck of the drill assembly during the drilling operation.

Spade portion 24 is preferably composed of carbide, and includes opposing faces 26, 26' which are generally planar and oriented parallel to one another. Further, these opposing faces are spaced-apart a predetermined distance (T) relative the diameter (D) of shaft 21. As will be described in greater detail below, this dimension relationship for spur-tipped spade drill bits of carbide has been found to significantly facilitate drilling or cutting of abrasive materials such as resin based particle boards and plywoods.

Opposing faces 26, 26' form opposing side edges 27, 27', and an end cutting edge 28 therebetween. Cutting edge 28 includes a pair of opposing side spurs, generally designated 30, 30', each having spur tip portions 31, 31' positioned at the lateral extremities of the cutting edge where they terminate at the corresponding side edge 27, 27'. A triangular-shaped center tip portion, generally designated 32, of the cutting edge is provided axially aligned with the drill bit longitudinal axis 22, and which includes a distal end 33 extending beyond side spurs 30, 30'. The profile of the center tip is partially provided by downward edge portions 34, 34' which angularly extend away from the tip distal end 33. Cutting edge 28 is further provided by respective converging edge portions 36, 36' extending between and connecting each side spur 30, 30' to center tip 32. Each converging edge portion 36, 36' intersects a respective downward edge portion 34, 34' at a corresponding concavely curved nadir portion 37, 37' which is positioned closer to center tip 32 than the respective side spur 30, 30'.

Accordingly, each nadir portion 37, 37' is sufficiently concavely curved, and is positioned in a manner biased toward the center tip such that the competition for space or wedging of the cut chips between the center tip 32 and side spur 30, 30' is substantially reduced or eliminated. This enables the cut chips to be more easily exhausted from the cutting edge for collection in the rotating cavity formed between the perimeter bore walls of the bore (not shown) and the opposing planar faces 26, 26' of spade portion 24. Thus, the drilling pressure or force in the axial direction of arrow 38 (FIG. 4) can be reduced or decreased while maintaining the same cutting capabilities. Moreover, the effective low end operating speed, as well as the power requirements (i.e., the torque and horsepower to rotationally drive the drill) are substantially reduced, as will be discussed below. This spur-tipped spade bit configuration has been found especially suitable for precision cutting or boring of holes in particle board, MDF, and plywoods, and these same materials faced with plastic laminates such as urea resin or melamine resin based particle boards and plywoods, or other similarly abrasive materials resistant to cutting.

The present invention further attempts to shorten the overall cutting edge length (i.e., the total length of the downward edges 34, 34'; the converging edges 36, 36'; and the nadir portions 37, 37') while still providing side spurs 30, 30' of sufficient dimension to enable more precise cutting of the perimeter bore walls of the bore in these materials. The shorter the cutting edge length, the less friction encountered during the drilling operation by the cutting edge which enables lower power requirements, as well as lower drilling pressures.

To form side spurs 30, 30', the nadir portions 37, 37' of cutting edge 28 must be positioned below a horizontal plane 40 (FIG. 7) intersecting the spur tips 31, 31'. This arrangement, however, inherently lengthens the cutting edge as compared to a straight line spanning spur tip 31 to the center tip distal end 33 (not shown). As mentioned, these side spurs are desirable and necessary when cutting these abrasive materials since the spurs enable excavation of more precise bores.

However, if converging edges 36, 36' angle away from spur tips 31, 31' at too steep a converging angle α relative to horizontal plane 40 (FIG. 7), the total cutting edge length (i.e., double the length of one side), and hence the drilling friction, is substantially increased. Further, the recess between the center tip and the side spurs would be substantially V-shaped which in effect forms a corner portion. Accordingly, the cut chips would be competing for space in the V-shaped recess during the drilling operation, similar to the designs of the prior art. Another disadvantage is that since the preferred composition of the drill bit is carbide (a relatively hard, brittle material), too thin of side spurs 30, 30' would be susceptible to breakage or fracture.

On the other hand, if the converging edges form too shallow a converging angle α, the spur tips would not be definitive or pronounced enough to efficiently, effectively and precisely enable cutting of the desired abrasive and cut resistant materials. Accordingly, in the preferred embodiment, the converging angle α is between about 15 degrees to about 25 degrees, and most preferably about 20 degrees.

Similarly, the declination angles γ (i.e., the angle of declination of the downward edges relative to a horizontal plane 41 passing through center tip distal end 33 (FIG. 7)) provide center tip 32 with a sufficient steepness and sharpness to drill a centering hole in the abrasive materials, while further ensuring that the centering tip is sufficiently supported to prevent fracture or breakage of the carbide tip during the drilling operation. In this preferred arrangement, the declination angle γ of downward edges 34, 34' is preferably about 55 degrees to about 65 degrees, and most preferable about 60 degrees.

The declination angle γ, however, is a function of the height of the center tip distal end 33 (i.e., the distance L from the nadir portion 37, 37' to the tip distal end 33). Preferably, the center tip height L is about twice the height l of the side spur 30, 30' (i.e., the distance l from the nadir portion 37, 37' to the spur tip 31). It will be appreciated, however, that the height of the center tip (L) may be more than twice the height of the spur tip (1) without departing from the true spirit and nature of the present invention, as long as the nadir portions remain biased toward the center tip.

Accordingly, the angle of intersection σ between the converging edge 36, 36' and the downward edge 34, 34', is preferably between about 100 degrees to about 130 degrees, and most preferably about 115 degrees. Again, the combination of the converging angle α, the declination angle γ, and the intersection σ angle must cooperate to position or bias the concavely curved nadir portion 37, 37' closer to center tip 32 than side spur 30, 30'. Further, while the converging edges and the downward edges are generally linear, they may be slightly concavely curved.

As best viewed in FIG. 5, the spade portion 24, including center tip 32 and side spurs 30, 30', are essentially plumb. Accordingly, the hook angle (i.e., the angle of inclination of the opposing face 26, 26' of side spur 30, 30' relative to a vertical plane (not shown)) is preferably about 0 degrees. A positive hook angle, however, could be included. Further, the rake angle θ (i.e., the slant angle of inclination of the side spur converging edge 36 relative horizontal plane 40) is preferably about three (3) degrees to about five (5) degrees.

As shown in FIG. 6, side edges 27, 27' of spade portion 24 have a radius of curvature substantially similar to that of the shaft 21. This helps keep the bit centered during the drilling operation.

Briefly, as best illustrated in FIG. 5, spade portion 24 is formed by a thinner upper spade portion 42, provided by opposing faces 26, 26', and a thicker lower spade portion 43 which integrates with shank portion 21. Both the upper spade portion 42 and lower spade portion 43 include fillets portions 44, 46, respectively, to reduce force concentrations at those areas during operation.

As above-indicated, in the preferred embodiment, drill bit device 20 or at least upper spade portion 42 is composed of solid carbide. This alloy is more resistant to dulling when cutting such abrasive materials such as urea or melamine resin based particles boards and plywoods. It has been found, however, that for this alloy, the thickness (T in FIG. 5) of the spade upper portion 42 significantly affects the performance or dynamics of the spade drill bit's ability to cut the desired materials. Too thick an upper spade portion 42 considerably increases the friction during the drilling operation; while too thin an upper spade portion 42 subjects the drill bit to premature fracture or breakage. Accordingly, the ratio of the thickness or the diameter (D in FIG. 5) of shank 21 to the thickness (T in FIG. 5) of upper spade portion 42 (i.e., D:T), is preferably, about 5.25:1 to about 6.25:1, and most preferably about 5.5:1.

This dimensional relationship considerably increases the performance of a carbide, spur-tipped spade drill bit constructed in accordance with the present invention. For instance, a carbide drill bit of similar diameter and having the same cutting edge profile as the present invention, but having a D:T as low as 2.8:1, requires up to forty (40) percent more drilling pressure and drive torque at the same rotational speed to excavate a similar bore.

Moreover, as compared to the presently employed carbide brad-point tipped, fluted, drill bits for cutting these materials, the present invention is capable of effective and efficient excavation of the bore at a substantially lower effective cutting speed, and substantially less drilling force and power requirement. For example, in a 3/16th inch diameter carbide, spade-type drill bit having a cutting edge profile in accordance with the present invention, the effective low end drilling speed can be reduced by as much as twenty-five (25) percent from a conventional 3/16th inch diameter carbide, brad-point bit (i.e., about 900 rpm versus the recommended 1200 rpm of the brad-point drill for cutting melamine particle board).

Further, up to fifty (50) percent reduction in drilling pressure has been measured for the present invention versus the same diameter brad-point tipped drill. Finally, the present invention enables substantial reductions in the power requirements since drilling bit 20 can effectively operate at lower speeds and drilling torques to remove the desired stock.

What is claimed is:

1. A spade drill bit device comprising:
   an elongated shaft formed for rotation about a longitudinal axis thereof; and
   a flattened blade portion at one end of said shaft having generally planar and parallel opposing faces defining opposing side edges, and an end cutting edge therebetween, said cutting edge including
   a pair of opposing side spurs each having spur tip portions positioned at the lateral extremities of said cutting edge and terminating at the corresponding side edge,
   a triangular-shaped center tip axially aligned with said longitudinal axis and having a distal end extending beyond said side spurs, said center tip being defined by downward edge portions extending away from said distal end, and
   respective converging edge portions extending between and connecting each side spur to said center tip, each converging edge portion intersecting a respective downward edge portion at a corresponding concavely curved nadir portion positioned closer to said center tip than the respective spur portion.

2. The drill bit device as defined in claim 1 wherein, said converging edge portions are concavely curved.

3. The drill bit device as defined in claim 1 wherein, the height of said distal end of said center tip from said nadir portion is about twice the height of the distal end of each said spur tips therefrom.

4. A spade drill bit device comprising:
   an elongated shaft formed for rotation about a longitudinal axis thereof; and
   a flattened blade portion at one end of said shaft having generally planar and parallel opposing faces defining opposing side edges, and having an end cutting edge between said side edges, said cutting edge including:
   a pair of opposing side spurs each having spur tip portions positioned at the lateral extremities of said cutting edge,
   a triangular-shaped center tip axially aligned with said longitudinal axis and having a distal end extending axially beyond said side spurs, said center tip being defined by downward edge portions extending away from said distal end, and respective converging edge portions extending between and connecting each side spur to said center tip, each converging edge portion intersecting a respective downward edge portion at an intersecting angle located at a corresponding concavely curved nadir portion positioned closer to said center tip than to the respective spur portion, said intersecting angle between said converging edge and said downward edge being between about 100 degrees to about 130 degrees.

5. The drill bit device as defined in claim 4 wherein, said intersecting angle is about 115 degrees.

6. The drill bit device as claimed in claim 4 wherein, the angle of declination of said downward edge portions with a horizontal plane passing through said distal end between said converging edge and said downward edge is between about 55 degrees to about 65 degrees.

7. The drill bit device as defined in claim 6 wherein, said intersecting angle is between about 100 to about 130 degrees.

8. A spade drill bit device comprising:

an elongated shaft formed for rotation about a longitudinal axis thereof; and a flattened blade portion at one end of said shaft having generally planar and parallel opposing faces defining opposing side edges, and having an end cutting edge between said side edges, said side edges being convexly curved and said cutting edge including:

a pair of opposing side spurs each having spur tip portions positioned at the lateral extremities of said cutting edge, a triangular-shaped center tip axially aligned with said longitudinal axis and having a distal end extending axially beyond said side spurs, said center tip being defined by downward edge portions extending away from said distal end, and respective converging edge portions extending between and connecting each side spur to said center tip, each converging edge portion intersecting a respective downward edge portion at a corresponding concavely curved nadir portion positioned closer to said center tip than to the respective spur portion.

9. The drill bit device as defined in claim 8 wherein, the radius of curvature of said convexly curved side edges is provided by the distance from said distal end to the corresponding side edge.

10. A spade drill bit device comprising:

an elongated cylindrical shaft formed for rotation about a longitudinal axis thereof;

a flattened carbide blade portion at one end of said shaft having generally planar and parallel opposing faces defining opposing side edges, and an end cutting edge therebetween, said blade portion having a predetermined thickness between said opposing faces such that the ratio of the diameter of said shaft to said predetermined thickness is between about 5.25:1 to about 6.25:1, said cutting edge including a pair of opposing side spurs each having spur tip portions positioned at the lateral extremities of said cutting edge and terminating at the corresponding side edge, a triangular-shaped center tip axially aligned with said longitudinal axis and having a distal end extending beyond said side spurs, said center tip being defined by downward edge portions extending away from said distal end, and respective converging edge portions extending between and connecting each side spur to said center tip.

11. The drill bit device as defined in claim 10 wherein, said center tip is defined by downward edge portions extending away from said distal end, and each converging edge portion intersecting the respective downward edge portion at a corresponding curved nadir portion positioned closer to said center tip than the respective spur portion.

12. The drill bit device as defined in claim 11 wherein, the intersecting angle between said converging edge and said downward edge is between about 100 degree to about 130 degrees.

13. The drill bit device as defined in claim 12 wherein, said intersecting angle is about 115 degrees.

14. The drill bit device as defined in claim 12 wherein, the angle of declination of said downward edge portions with a horizontal plane passing through said distal end between said converging edge and said downward edge is between about 55 degrees to about 65 degrees.

15. The drill bit device as defined in claim 14 wherein, said intersecting angle is about 115 degrees.

16. The drill bit device as defined in claim 11 wherein, said opposing side edges are convexly curved.

17. The drill bit device as defined in claim 16 wherein, the radius of curvature of said convexly curved side edges is provided by the distance from said distal end to the corresponding side edge.

18. The drill bit device as defined in claim 11 wherein, said converging edge portions are concavely curved.

19. The drill bit device as defined in claim 11 wherein, said ratio is about 5.5:1.

20. The drill bit device as defined in claim 11 wherein, the height of said distal end of said center tip from said nadir portion is about twice the height of the distal end of each said spur tips therefrom.

* * * * *